US008577970B2

(12) United States Patent
Hogan et al.

(10) Patent No.: US 8,577,970 B2
(45) Date of Patent: Nov. 5, 2013

(54) METHOD, APPARATUS AND COMPUTER PROGRAM FOR IDENTIFYING ANY DISCREPANCIES IN AN EMAIL DISTRIBUTION LIST

(75) Inventors: Natalie Sian Hogan, Winchester (GB); Andrew John Emry Menadue, Winchester (GB); David Adam Sinclair, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 1402 days.

(21) Appl. No.: 11/735,012

(22) Filed: Apr. 13, 2007

(65) Prior Publication Data

US 2007/0250588 A1      Oct. 25, 2007

(30) Foreign Application Priority Data

Apr. 19, 2006   (GB) .................................. 0607759.8

(51) Int. Cl.
*G06F 15/16*      (2006.01)
*H04L 29/06*      (2006.01)
*G06F 17/00*      (2006.01)

(52) U.S. Cl.
USPC ................ 709/206; 709/203; 713/155; 726/1

(58) Field of Classification Search
USPC ..................... 709/203, 206; 707/10
See application file for complete search history.

(56) References Cited

U.S. PATENT DOCUMENTS

| | | | |
|---|---|---|---|
| 6,393,421 B1 * | 5/2002 | Paglin | 707/9 |
| 6,523,027 B1 * | 2/2003 | Underwood | 707/4 |
| 6,829,607 B1 | 12/2004 | Tafoya et al. | |
| 2002/0138582 A1 * | 9/2002 | Chandra et al. | 709/206 |
| 2002/0188690 A1 | 12/2002 | Lee | |
| 2005/0076110 A1 * | 4/2005 | Mathew et al. | 709/223 |
| 2005/0204001 A1 * | 9/2005 | Stein et al. | 709/206 |
| 2006/0004736 A1 * | 1/2006 | Fair et al. | 707/4 |

* cited by examiner

*Primary Examiner* — Ranodhi Serrao
(74) *Attorney, Agent, or Firm* — Matthew C. Zehrer

(57) ABSTRACT

A method for identifying discrepancies in an email distribution list is provided in various embodiments of this present invention. The method includes receiving from an originating client an email addressed to a list of recipients; examining the list of recipients to identify one or more possible amendments to the list of recipients; and informing the originating client of any identified amendments. In other embodiments, examining the list of recipients further includes comparing the recipient list with one or more trusted lists or a directory to identify one or more possible amendments to the list of recipients to identify those recipients missing or sharing a common attribute. In other embodiments it is determined if other names in the directory, but no in the recipient list, also share the common attribute. Subsequently, one or more amendments may be made to the recipient list based on such absent names.

7 Claims, 6 Drawing Sheets

METHOD, APPARATUS AND COMPUTER PROGRAM FOR IDENTIFYING ANY DISCREPANCIES IN AN EMAIL DISTRIBUTION LIST

FIELD OF THE INVENTION

The invention relates to the field of emailing and more particularly to distributing email to a group of people.

BACKGROUND OF THE INVENTION

Out-of-date or inappropriate email distribution lists can result in members of teams not receiving email intended for them. For example, new joiners or temporary visitors may be on official lists but not those kept in other places or manually maintained lists. In order to see the email, the people who didn't receive it first have to find out that they were missed off and then request for someone else to provide them with a copy.

FIG. 1 provides an overview of this problem. Server 10 receives emails from various clients (two shown 20, 30). Server 10 hosts mailboxes 40, with each mailbox being owned by a receiving client 50. All mail for a particular receiving client is stored in the mailbox associated with that client. Email application 60 on the server adds and retrieves mail from appropriate mailboxes at the behest of the clients.

It will be appreciated that some emails from clients 20, 30 may not be addressed to clients having a mailbox on the server. In this case, email application 80 forwards such emails onto an appropriate email server 90. This process is known in the art and so will not be discussed in any more detail herein.

Some emails will be addressed to a group of people rather than just a single recipient. Clients 20, 30 may reference a server-based distribution list 95 (or that of another email server—not shown). Alternatively, clients 20, 30 may spell out each person's name or use their own locally resolvable distribution list.

As alluded to above, sending emails to groups of people can prove problematic. Originating client 20 may use an official distribution list, recently updated to include a number of new joiners to a team. Client 30, on the other hand, may have their own local version of the same distribution list. Manually maintained lists can easily become out of date and can result in certain people being left out. Therefore, there is a need for a method, apparatus and computer program for identifying discrepancies in an email distribution list.

SUMMARY OF THE INVENTION

According to a first aspect, there is provided a method for identifying any discrepancies in an email distribution list, the method comprising: receiving from an originating client an email addressed to a list of recipients; and examining the list of recipients to identify one or more possible amendments to the list of recipients; and informing the originating client of any identified amendments.

In one embodiment an addition to the list of recipients is suggested.

In one embodiment, a deletion from the list of recipients is suggested.

The preferred embodiment involves taking corrective action. This may only happen when the originating client has confirmed that correction action should be taken.

In one embodiment, examining the list of recipients involves comparing the recipient list with one or more trusted lists in order to identify one or more possible amendments to the list of recipients.

In another embodiment, the recipient list is compared with a directory including the recipients to identify those recipients missing a common attribute. One or more possible amendments to the list of recipients are then identified on the basis of which recipients are missing the common attribute.

In another embodiment, the recipient list is compared with a directory including the recipients to identify an attribute common to all the recipients. It is then determined if other names in the directory, yet absent from the recipient list, also share the common attribute. One or more possible amendments to the list of recipients on the basis of such absent names.

In one embodiment, names are grouped according to various criteria. Grouped names are then preferably used in order to identify one or more possible amendments. By way of example, the recipient list is compared with grouped names to identify partial matches which indicate potential omissions from the recipient list. By way of another example, grouped names are compared with the recipient list to identify partial matches which indicate potential incorrect additions to the recipient list.

In one embodiment, it is determined that the originating client has sent previous emails which included a keyword common to the received email. Any differences identified between the recipient list for the previous emails and the recipient list for the received email can be used to identify one or more possibly amendments.

In one embodiment, a trustworthiness is associated with the originating client. This is used to decide whether to examine the list of recipients.

According to a second aspect, there is provided an apparatus for identifying any discrepancies in an email distribution list, the apparatus comprising: means for receiving from an originating client an email addressed to a list of recipients; and means for examining the list of recipients to identify one or more possible amendments to the list of recipients; and means for informing the originating client of any identified amendments.

According to a third aspect, the invention is implemented in computer software.

BRIEF DESCRIPTION OF THE DRAWINGS

Various embodiments of the present invention are hereinafter described in conjunction with the appended drawings.

It is to be noted, however, that the appended drawings illustrate only example embodiments of the invention, and are therefore not considered limiting of its scope, for the invention may admit to other equally effective embodiments.

DETAILED DESCRIPTION

Out-of-date or inappropriate email distribution lists can result in members of teams not receiving email intended for them. The solution taught herein discloses a server which monitors who receives emails and identifies potential discrepancies.

Figure 1:
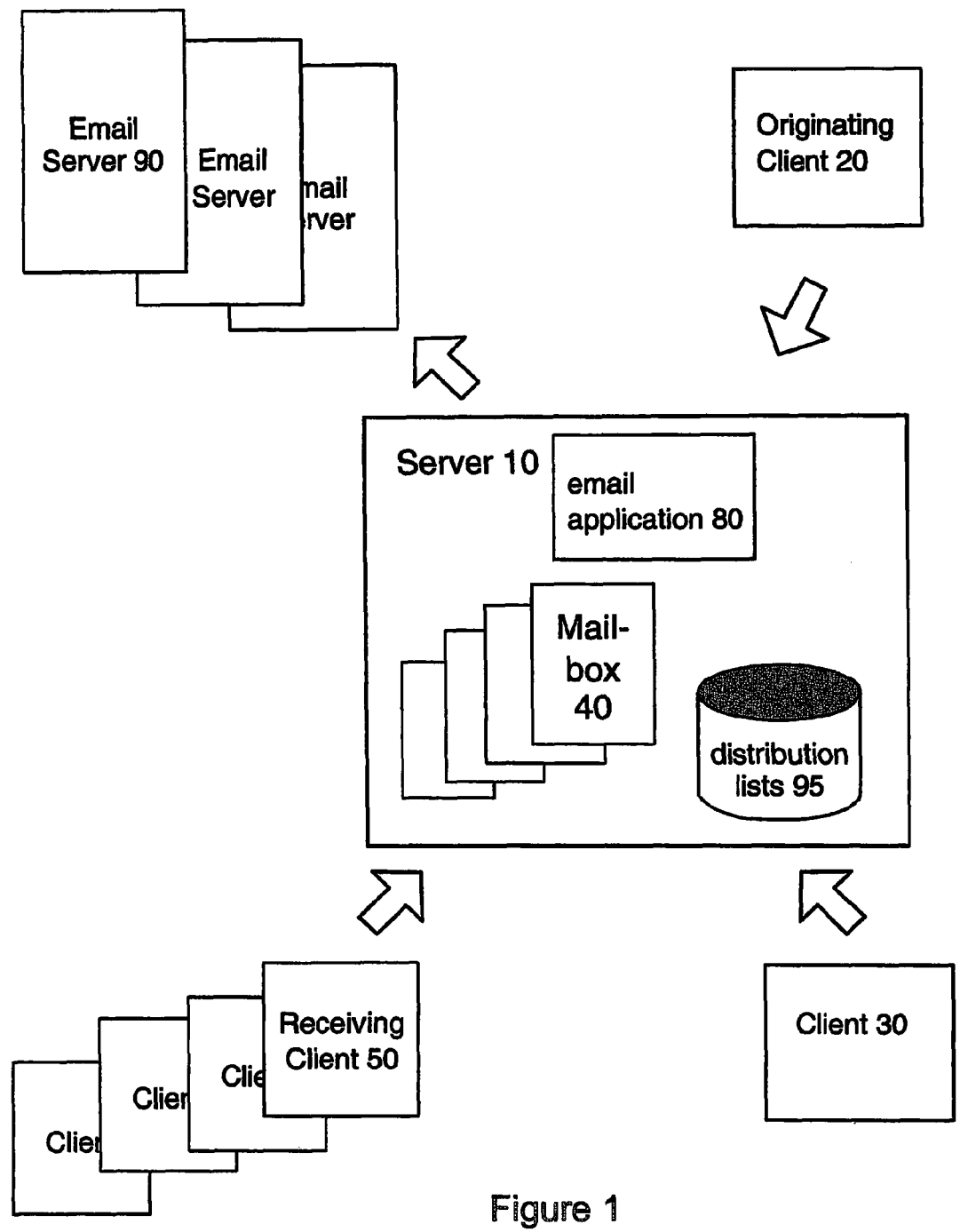
FIG. 1 shows an overview of an email system according to the prior art.
Figure 2A:
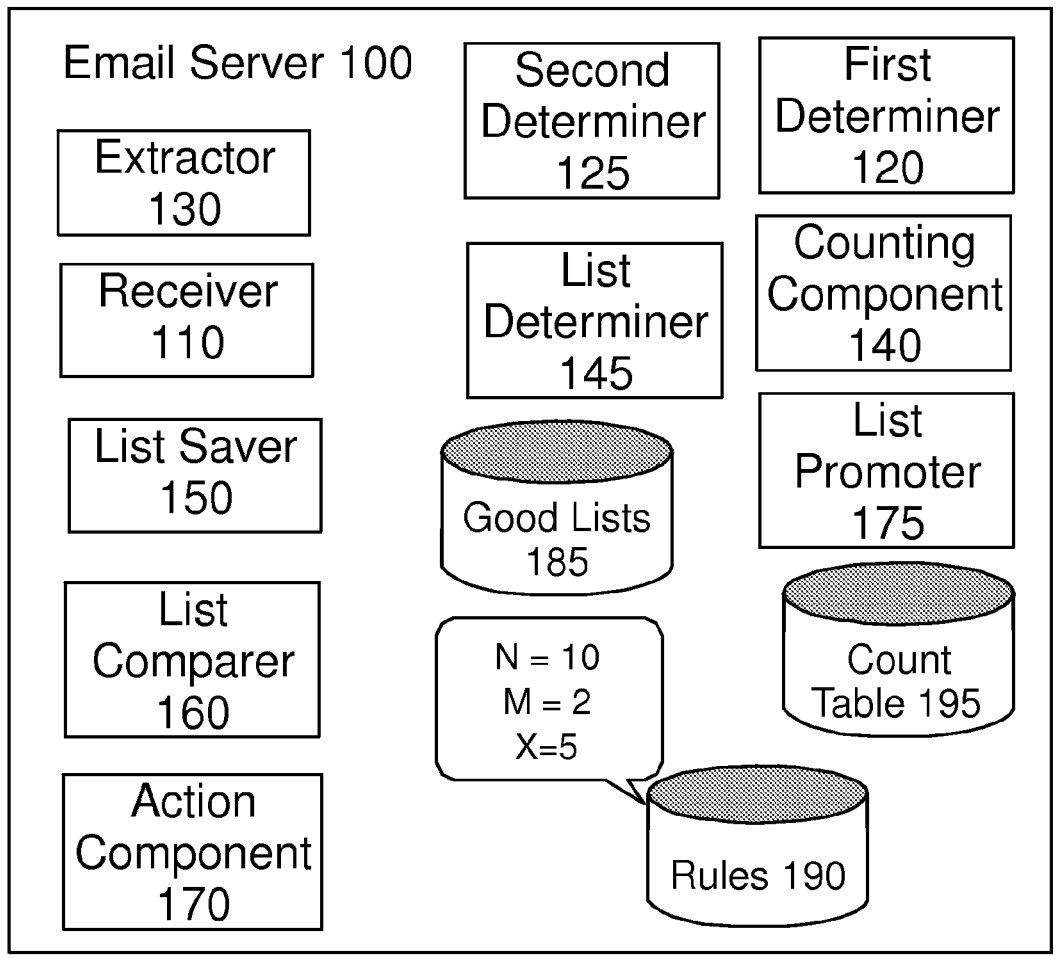
FIG. 2a illustrates the componentry of the present invention according to a preferred embodiment.
Figure 2B:
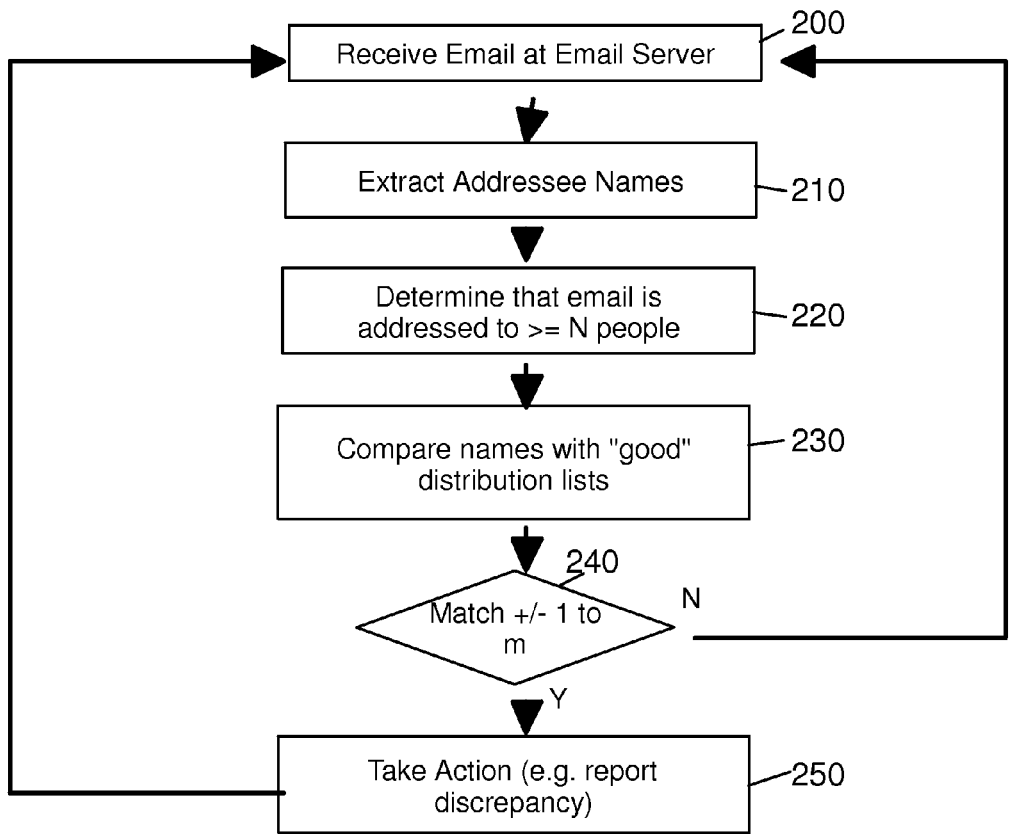
FIGS. 2b and 2c illustrate the processing of the present invention according to a preferred embodiment.
Figure 2C:
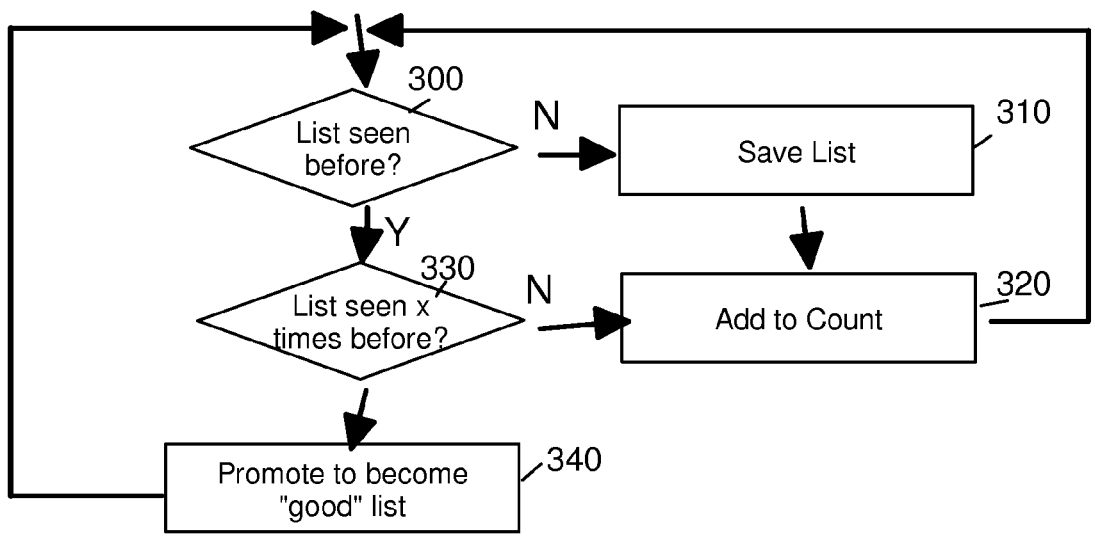

FIG. 2a is a component diagram of an email server in accordance with a preferred embodiment of the present invention. FIGS. 2b and 2c are flow charts of the processing of the present invention in accordance with a preferred embodiment. The figures should be read in conjunction with one another.

Email server 100 receives a new email via receiver component 110 (block 200). As indicated above, the solution disclosed herein is particularly applicable to emails addressed to a group of people. Consequently the names of the people to whom the email is addressed are extracted by extractor component 130 (block 210). It will be appreciated that clients may use their own local distribution lists. If this is the case, such distribution lists will be resolved at the local client to full email addresses before being received at the server. If on the other hand, clients use server based distribution lists, the server will have to resolve any references.

Once the names have been resolved as necessary and extracted, first determiner component 120 determines when the email is addressed to N or more people (block 220). N is a preconfigured number stored in rules database 190. If it is the case that the email is addressed to an appropriate number of people, the algorithm of the preferred embodiment is initiated.

The extracted names are compared by list comparer 160 with the known "good" distribution lists 185 (block 230). Good (or trusted) distribution lists preferably comprise official server-based distribution lists and newly promoted "good" lists. The process for promoting lists will be described later with reference to FIG. 2c.

It is determined by second determiner component 125 whether the size of the extracted list of names matches the size of any of the "good" lists by +/−1 to m (block 240). M is preferably a preconfigured number stored in rules data base 190 and in the exemplary embodiment is 2.

If it is determined that the extracted names partially match the known good distribution lists by a difference of +/−1 to m, remedial action is initiated by action component 170 (block 250).

The processing described above will now be illustrated with an example:

X has sent mail to A B C D E (list 1)
Y has sent mail to A B C E F (list 2)

Either every list of names that is received from a client is stored as a "good" list or an algorithm (described later with reference to FIG. 2c) is applied to determine when a received list of names should be promoted to become a good list. The latter is preferred; however for ease of explanation, lists 1 and 2 are now assumed to be in the set of good lists.

Z sends mail to A B D E (list 3)

List 3 is compared with all lists in the set of good lists.

One of these lists is list 1. Matches between list 3 and list 1 reveals that addressee C is missing from list 3. Since M is 2 and thus the range is +/−1 to 2, the test at step 240 is true—i.e. the test evaluates to −1. Addressee C is recognised as missing and added to an omissions list (not shown).

Another of these lists is list 2. When the test is performed (block 240) for list 2, it is determined that addressees C and F are now missing. Thus the test evaluates to −2 and is therefore also true. C is already on the omissions list so only F is added to omissions list.

When all comparisons are completed, the omissions list is returned to Z. Z can then make a determination as to whether C and F were intentional omissions or whether the email should be sent to C and/or F.

There are various ways in which the omissions could be presented back to Z. The example above makes no distinction between the lists but simply informs Z that C and F are possible omissions. In another embodiment, Z is informed that one list searched includes C and F over and above the people to whom they had addressed their email whilst a second list includes only C. Z can then decide how best to proceed.

By way of another example, Z sends mail to A B C E F G. Lists 1 and 2 are still the same. The test (block 240) determines that in comparison to list 1, F and G are additions (+2) and D is an omission (−1) and in comparison to list 2, G is an addition (+1). Such information is reported back to Z. In other words, it is reported to Z that they have possibly omitted D and that F and G should possibly not have received the original mail.

In one embodiment, Z may provide feedback to the server which may cause the update of one or more good lists at the server.

As discussed above, the processing of the present invention has the concept of "good" or trusted lists to determine whether or not to report addressee discrepancies to an emailing client. The way in which received lists can be promoted to become good lists will be discussed with reference to FIG. 2c.

The names of the addressees which are extracted at block 210 are used as input to block 300. Here it is determined by list determiner component 145 whether this list of names has been seen before. If the answer is no, then the list is saved for future use (block 310) using list saver component 150. A counting component 140 associates 1 with the saved list, thereby indicating the number of times that this list has been seen (block 320). The process then loops round.

If on the other hand, at block 300, it is determined that the list of names has been seen before, then the test at block 330 is performed. Here it is determined by list determiner component 145 whether the list has been seen x times before. Once again x is a preconfigured number stored in rules database 190 and indicates the number of times a list must be seen before it is to be trusted. By way of example only, x may be 5. If the list of names has not been seen x times before, then the count associated with the list is updated by counting component 140 at block 320 and the process loops round. If on the other hand, the list of names has been seen x times before, then that lists is promoted to become a "good" list at block 340 (list promoter component 175).

In this way, it is possible to determine which lists of names should be trusted and which still need to earn trust.

Saved lists and those promoted to become "good" lists may have timestamps associated with them. This makes it possible for lists to be aged and to be automatically deleted when they become "old" (e.g., older than 10 days). In another embodiment, it is possible for lists to be manually deleted/marked as obsolete. Thus storage space is saved.

In one embodiment, email servers share good lists and known distribution lists with one another.

Figure 3A:
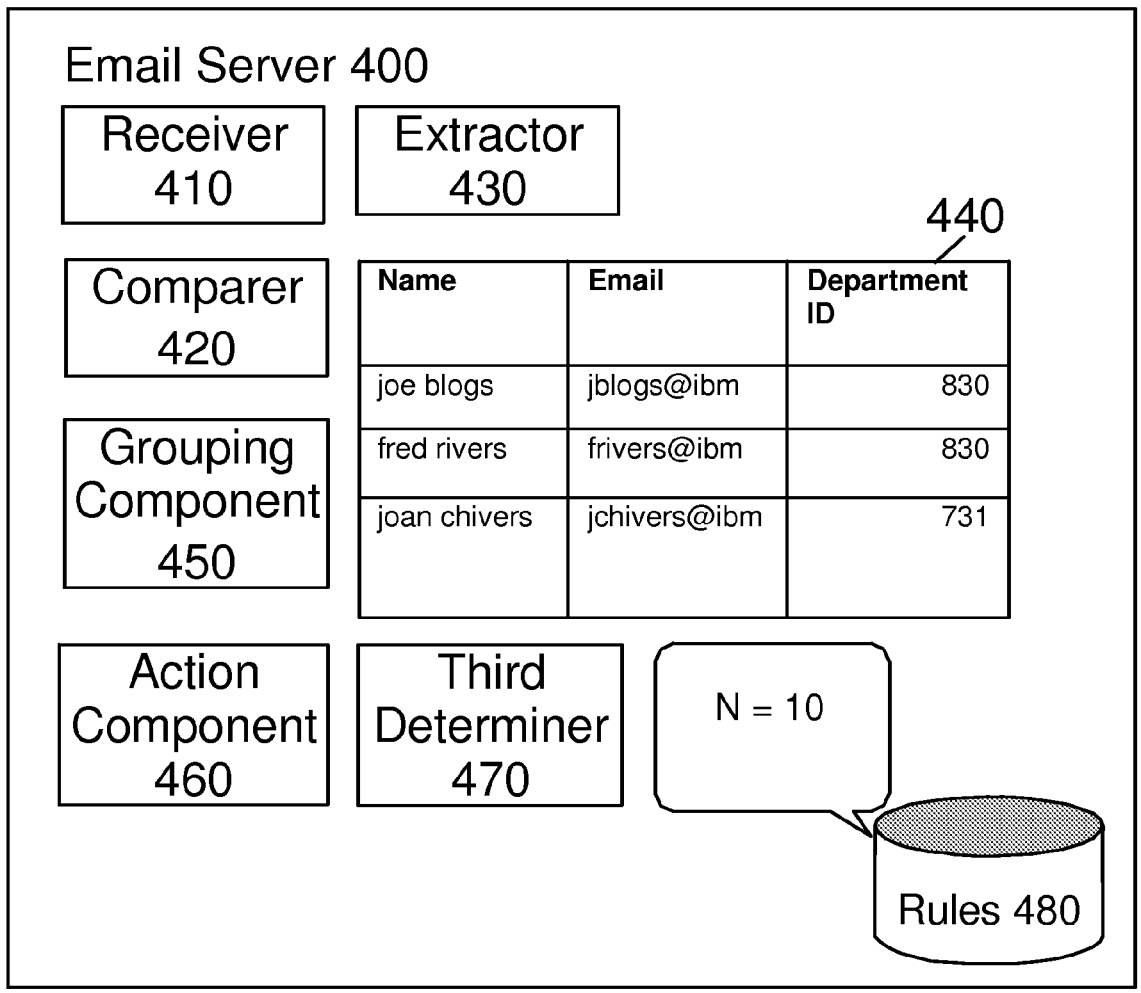
FIGS. 3a and 3b illustrate the componentry and processing of the present invention in accordance with a second embodiment.
Figure 3B:
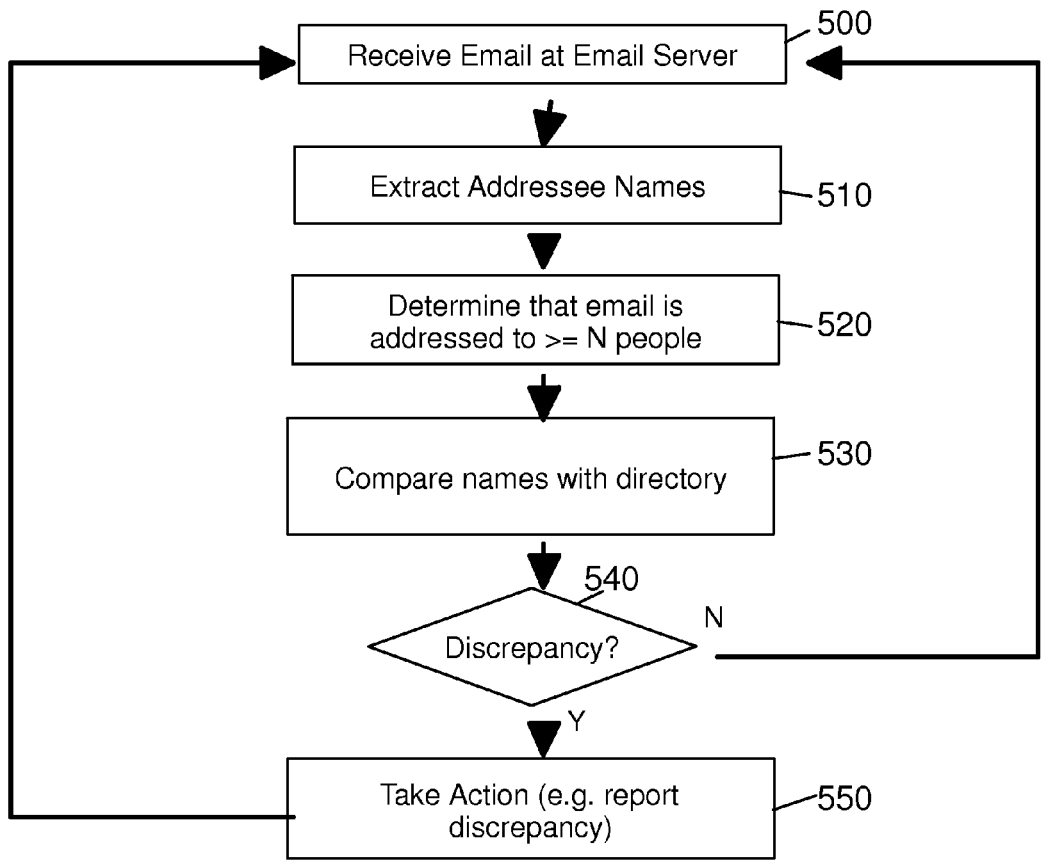

In a second embodiment, the concept of "good" lists is not used. The componentry and processing of this embodiment will be described with reference to FIGS. 3a and 3b (which should be read in conjunction with one another).

Email server 400 receives a new email via receiver component 410 at block 500. The list of addressees is extracted via extractor component 430 at block 510. As before, it may be necessary to resolve any referenced distribution lists.

Third determiner component 470 then determines whether the email is addressed to a suitably large number of people N (block 520). N is a preconfigured value stored in rules database 480. In this embodiment, N is yet again 10.

Assuming that the email is addressed to an appropriate number of people, then the algorithm of this embodiment is initiated.

Comparer component 420 compares the extracted names with a directory 440 (block 530). Directory 440 may include information such as employee name; email address and department id. In the example provided, it can be seen that Joe Bloggs and Fred Rivers both belong to department 830. Joan Chivers, on the other hand, is part of department 731.

The test at block 540 determines via the comparer component 420 whether there are any discrepancies. If there are none, then the process loops round, otherwise actioner component 460 takes appropriate remedial action (block 550). Such action may be the same as described with reference to the first embodiment.

As described immediately above, block 540 looks for discrepancies. For example, an email may be addressed to Joe Bloggs, Fred Rivers and Joan Chivers. The comparer component 420 may notice that Joe and Fred both belong to the same department (830), whilst Joan is in a different department (731). Thus actioner component 460 may report back to the originator of the email that there is a potential mistake here. Thus it would be possible to ask the originator whether they still want to send the email to somebody who had moved departments. Equally, it would be possible to determine that an email is being sent to everybody in a department except for person A. In this case, the originator could be asked whether A is an intentional omission.

It will be appreciated that only three names and not ten are discussed here for ease of explanation only.

Whilst the illustration given relates to a department id, it will be appreciated that other variations are possible. For example, the directory may include different or additional information enabling other discrepancies to be identified. For example, employees may also be grouped by work project, team etc. Preferably, rules database 480 is accessed by the comparer component 420 in order to decide which discrepancies to look for.

In another embodiment, people can be grouped by an administrator according to various criteria. Grouping component 450 is used to achieve this and provides additional flexibility. In this embodiment, an administrator is no longer tied to directory based information only. In one embodiment, an administrator may receive grouping requests from originating clients.

In a variety of embodiments, the email server preferably reports omissions/additions to an originating client and takes corrective action based on feedback from the originating client. For example, the email server may modify the addressee list based a client's feedback. In this way receiving clients should receive emails that are indeed intended for them. In other words, there is no need for an originating client to take corrective action (e.g., to resend an item of mail to a previously omitted client).

It should be appreciated that whilst the embodiments described makes use of preconfigured values (e.g., x, M and N), these could equally be administrator configurable.

In various embodiments, the processing of the present invention can be switched off for certain emailing clients. The "From" field of a received email is preferably compared against a list of emailers who either desire or do not desire the processing of the present invention.

In one embodiment, it is detected that a person (or group of people) regularly sends data with the same keywords (e.g., "Project Y" in the subject field) to the same list, the server could identify that one week person X has been omitted, allowing the sender to confirm the omission or add person X to the distribution. This involves associating keywords with trusted lists and analysing not only a new emails recipient list but also scanning the email (or certain parts thereof for particular keywords.

In one embodiment, the trustworthiness of email originator is taken into account. For example, a department secretary may be given more credence than other members of the department. In this embodiment, information such as job title may be looked up in a directory based server in order to determine how much credence to give the originator of the email. In one embodiment trust may be earned (e.g., by x number of confirmations that a person should be added and/or deleted).

The accompanying figures and this description depicted and described embodiments of the present invention, and features and components thereof. Those skilled in the art will appreciate that any particular program nomenclature used in this description was merely for convenience, and thus the invention should not be limited to use solely in any specific application identified and/or implied by such nomenclature. Thus, for example, the routines executed to implement the embodiments of the invention, whether implemented as part of an operating system or a specific application, component, program, module, object, or sequence of instructions could have been referred to as a "program", "application", "server", or other meaningful nomenclature. Therefore, it is desired that the embodiments described herein be considered in all respects as illustrative, not restrictive, and that reference be made to the appended claims for determining the scope of the invention.

The invention claimed is:

1. A method for identifying any discrepancies in an email distribution list, the method comprising:
   receiving, from an originating client an email addressed to a list of recipients, in an email server; and
   comparing in the email server the list of recipients against a trusted distribution list; and
   identifying one or more possible amendments to the list of recipients if the list of recipients differs from the first trusted distribution list by more than a predetermined amount; and
   informing the originating client of any identified amendments; and
   determining in the email server whether the list of recipients should be promoted to the trusted distribution list.

2. The method of claim 1, wherein the step of informing the originating client of any identified amendments comprises:
   suggesting an addition and/or a deletion to the list of recipients.

3. The method of claim 1, wherein the step of comparing the list of recipients comprises:
   comparing the recipient list with a directory including the recipients to identify those recipients missing a common attribute; and
   identifying one or more possible amendments to the list of recipients on the basis of which recipients are missing the common attribute.

4. The method of claim 1, wherein the step of comparing the list of recipients comprises:
   comparing the recipient list with a directory including the recipients to identify an attribute common to all the recipients;
   determining if other names in the directory, yet absent from the recipient list, also share the common attribute; and
   identifying one or more possible amendments to the list of recipients on the basis of such absent names.

5. The method of claim 4 further comprising:
grouping names according to various criteria; and
using grouped names in performance of the examining step.

6. The method of claim 5, wherein the step of grouping names according to various criteria comprises:
comparing the recipient list with grouped names to identify partial matches which indicate potential omissions from the recipient list.

7. The method of claim 6, wherein the step of grouping names according to various criteria comprises:
comparing the recipient list with grouped names to identify partial matches which indicate potential incorrect additions to the recipient list.

* * * * *